United States Patent
Garret et al.

(10) Patent No.: US 8,739,857 B2
(45) Date of Patent: Jun. 3, 2014

(54) HEAT EXCHANGER COMPRISING A HEAT EXCHANGE CORE AND A HOUSING

(75) Inventors: Paul Garret, Veneux les Sablons (FR); Philippe Faille, Reims (FR)

(73) Assignee: Valeo Systemes Thermiques, Le Mesnil Saint Denis, Cedex (FR)

( * ) Notice: Subject to any disclaimer, the term of this patent is extended or adjusted under 35 U.S.C. 154(b) by 336 days.

(21) Appl. No.: 13/001,162

(22) PCT Filed: Jun. 22, 2009

(86) PCT No.: PCT/EP2009/057740
§ 371 (c)(1),
(2), (4) Date: Mar. 14, 2011

(87) PCT Pub. No.: WO2009/156363
PCT Pub. Date: Dec. 30, 2009

(65) Prior Publication Data
US 2011/0168365 A1    Jul. 14, 2011

(30) Foreign Application Priority Data

Jun. 26, 2008    (FR) ...................................... 08 03598

(51) Int. Cl.
*F28D 7/10*    (2006.01)
*F28D 1/00*    (2006.01)

(52) U.S. Cl.
USPC ........................................ 165/157; 165/149

(58) Field of Classification Search
CPC .......... F28F 9/0219; F28F 9/0224; F28F 9/12
USPC .......................... 165/149, 153, 157, 158, 173
See application file for complete search history.

(56) References Cited

U.S. PATENT DOCUMENTS

| | | | | |
|---|---|---|---|---|
| 2,462,421 A | * | 2/1949 | Pitt | 165/81 |
| 5,579,833 A | * | 12/1996 | Wijkstrom | 165/173 |
| 5,944,095 A | * | 8/1999 | Fukuoka et al. | 165/173 |
| 6,269,870 B1 | * | 8/2001 | Banzhaf et al. | 165/158 |
| 6,595,274 B2 | * | 7/2003 | Hayashi et al. | 165/158 |
| 2003/0010479 A1 | | 1/2003 | Hayashi et al. | |

(Continued)

FOREIGN PATENT DOCUMENTS

| DE | 19902504 A1 | 8/2000 |
|---|---|---|
| DE | 19927607 A1 | 12/2000 |

(Continued)

OTHER PUBLICATIONS

English language abstract for DE 19902504 extracted from the espacenet.com database on Jul. 7, 2011, 6 pages.

(Continued)

*Primary Examiner* — Tho V Duong
(74) *Attorney, Agent, or Firm* — Howard & Howard Attorneys PLLC

(57) ABSTRACT

The invention relates to a heat exchanger (10) comprising a heat exchange core (12) and a housing (14), inside which the heat exchange core (12) is housed. The housing (14) comprises a body having at least one open face, with the body defining a frame around the open face. The body is formed by at least two parts (30; 32; 34; 36), which are assembled together by brazing, with at least two of the parts being provided adjacent to one another comprising means (40) for creating a support surface for a manifold (48).

14 Claims, 2 Drawing Sheets

(56) References Cited

U.S. PATENT DOCUMENTS

| | | |
|---|---|---|
| 2003/0196785 A1 | 10/2003 | Knecht et al. |
| 2005/0077035 A1* | 4/2005 | Lamich .................. 165/175 |
| 2005/0189097 A1 | 9/2005 | Fowser et al. |
| 2006/0048759 A1 | 3/2006 | Hendrix et al. |
| 2006/0048921 A1 | 3/2006 | Usui et al. |
| 2006/0219394 A1 | 10/2006 | Martin et al. |
| 2006/0278377 A1 | 12/2006 | Martins et al. |
| 2008/0230213 A1* | 9/2008 | Roll ........................ 165/173 |
| 2010/0089548 A1 | 4/2010 | Braic et al. |
| 2011/0162826 A1 | 7/2011 | Garret et al. |
| 2011/0168366 A1 | 7/2011 | Garret et al. |
| 2011/0168370 A1 | 7/2011 | Garret et al. |

FOREIGN PATENT DOCUMENTS

| | | |
|---|---|---|
| DE | 102005042908 A1 | 4/2006 |
| DE | 102005037156 A1 | 2/2007 |
| EP | 1348924 A2 | 10/2003 |
| FR | 2814537 A1 | 3/2002 |
| FR | 2855605 A1 | 12/2004 |
| FR | 2856747 A1 | 12/2004 |
| JP | 09089491 | 4/1997 |
| JP | 09310996 | 12/1997 |
| JP | 2000282963 | 10/2000 |
| JP | 2000304486 | 11/2000 |
| WO | WO 2004065874 | 8/2004 |
| WO | WO 2008125309 | 10/2008 |
| WO | WO2009156364 A1 | 12/2009 |
| WO | WO2009156365 A1 | 12/2009 |
| WO | WO2010003807 A1 | 1/2010 |

OTHER PUBLICATIONS

English language abstract for DE 19927607 extracted from the espacenet.com database on Jul. 5, 2011, 9 pages.

English language abstract and equivalent for DE 102005042908 extracted from the espacenet.com database on Jul. 6, 2011, 23 pages.

English language abstract and equivalency for EP 1348924 extracted from the espacenet.com database on Jul. 5, 2011, 11 pages.

English language abstract for FR 2814537 extracted from the espacenet.com database on Jul. 7, 2011, 25 pages.

English language abstract for FR 2855605 extracted from the espacenet.com database on Jul. 6, 2011, 19 pages.

No English language abstract available for FR 2856747. However, see English language equivalency extracted from the espacenet.com database on Jul. 5, 2011, 31 pages.

English language translation for JP 09089491 extracted from the PAJ database on Jul. 6, 2011, 21 pages.

English language translation for JP 2000282963 extracted from the PAJ database on Jul. 6, 2011, 18 pages.

English language translation for JP 2000304486 extracted from the PAJ database on Jul. 5, 2011, 25 pages.

English language abstract and equivalent for WO 2004065874 extracted from the espacenet.com database on Jul. 7, 2011, 35 pages.

English language abstract and equivalent for WO 2008125309 extracted from the espacenet.com database on 7/6/201, 50 pages.

Traite de Cooperation en Matiere De Brevets International Search Report for Application No. PCT/EP2009/057739 dated Oct. 23, 2009, 6 pages.

Traite de Cooperation en Matiere De Brevets International Search Report for Application No. PCT/EP2009/057740 dated Sep. 18, 2009, 4 pages.

Traite De Cooperation en Matiere De Brevets International Search Report for Application No. PCT/EP2009/057741, dated Sep. 9, 2009, 3 pages.

Traite De Cooperation en Matiere De Brevets International Search Report for Application No. PCT/EP2009/057742 dated Sep. 18, 2009, 4 pages.

English language translation for JP 09310996 extracted from the PAJ database on Jul. 6, 2011, 22 pages.

* cited by examiner

1

HEAT EXCHANGER COMPRISING A HEAT EXCHANGE CORE AND A HOUSING

RELATED APPLICATIONS

This application claims priority to and all the advantages of International Patent Application No. PCT/EP2009/057740, filed on Jun. 22, 2009, which claims priority to French Patent Application No. FR 08/03598, filed on Jun. 26, 2008.

The invention relates to the field of heat exchangers, in particular for motor vehicles.

It relates more particularly to a heat exchanger comprising a heat exchange core and a housing, inside which said heat exchange core is housed.

This type of exchanger is used in particular as an intercooler for a motor vehicle combustion engine.

In this case, the gas to be cooled is charge air (or a mixture of charge air and recirculated exhaust gases). Once it has passed through the heat exchanger, the air is admitted into the combustion engine through an air distributor.

A heat exchanger of this kind is known in particular from document DE 199 02 504. This document provides a heat exchanger in which the charge air is cooled by a heat transfer fluid which, in this case, is coolant, that is to say water, to which glycol has been added, originating from what is known as a low temperature circuit of a motor vehicle.

This exchanger comprises a heat exchange core housed in a plastic housing closed by a cover. This solution makes it easier to integrate the inlet/outlet housings for the charge air.

An exchanger of this kind has, however, difficulties, in particular with regard to pressure resistance.

The invention aims to improve the situation by providing an exchanger which, in particular, improves the pressure resistance while affording a solution to the securing of the inlet/outlet housings for the charge air.

To this end, it provides an exchanger comprising a heat exchange core and a housing, inside which the heat exchange core is housed. The housing comprises a body having at least one open face, the body defining a frame around the open face. The body is formed by at least two parts, which are assembled together by brazing, at least two of said parts being provided adjacent to one another comprising means for creating a support surface for a manifold.

Thus, thanks to the present invention, a robust housing that can easily accommodate inlet/outlet housings for the charge air is formed.

Further advantages and features of the invention will become more clearly apparent from reading the illustrative and nonlimiting description of examples derived from the figures of the appended drawings, in which.

The invention relates to a heat exchanger 10 comprising a heat exchange core 12 and a housing 14, inside which the heat exchange core 12 is housed.

The heat exchange core is produced, in a manner known to a person skilled in the art, from a stack of plates 16 and corrugated inserts (not shown). The core 12 comprises an inlet and an outlet for charge air.

The plates 16 could be, for example, stamped plates comprising two bosses provided with openings. The plates 16 are arranged in pairs and the respective bosses of a plate belonging to one pair are connected to the respective bosses of an adjacent plate belonging to a pair of adjacent plates. This establishes a fluid connection, here of heat transfer liquid, between the respective pairs of plates.

Figure 1:
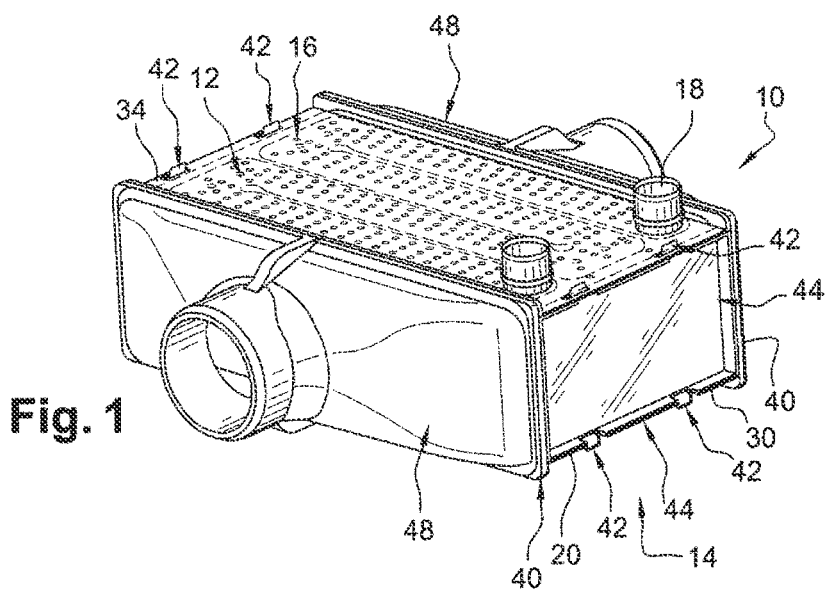
FIG. 1 shows a partially assembled view of the heat exchanger according to the present invention.

FIG. 1 shows a heat exchanger, in which an upper part of the housing has been removed in order to reveal the structure of a plate 16 of the heat exchange core 12.

In this embodiment, the plate 16 comprises a set of first pressings, called contiguous pressings, for defining channels and return paths for the heat transfer fluid to flow through in passes. Here, the plate 16 comprises four channels and three return paths for defining four flow passes for the heat transfer liquid.

The plate 16 further comprises a second set of pressings, which are less deep than the first set of pressings described above. This second set of pressings is positioned in the various flow passes of the heat transfer liquid. These pressings are able to disrupt the flow of the heat transfer liquid, thereby improving the heat exchange between the latter and the charge air.

The heat exchange core 10 further comprises corrugated inserts (which cannot be seen in FIGS. 1 and 2) located in each case between adjacent pairs of plates and brazed to the plates 16. Charge air flows between each pair of plates through the corrugated inserts.

In other words, the core 12 delimits first channels, containing the corrugated inserts, for the gas to be cooled and second channels for the heat transfer liquid to flow through. In the embodiment proposed, the heat transfer liquid could be engine coolant, that is to say water, to which glycol has been added, originating, for example, from what is known as a low temperature circuit of a motor vehicle.

The charge air is thus cooled by the coolant, which passes into the core 12, for example through an inlet tube 18, flows into the second channels of the core in order to exchange heat with the charge air to be cooled and finally leaves the core, for example through the outlet tube 20.

The heat exchange core 12 is housed inside a housing 14 and is brazed to the latter. In the examples shown in FIGS. 1 to 3, the housing 14 comprises a body having at least one open face. The housing 14 could be metallic, and in particular made of aluminum or an aluminum alloy.

In the embodiments illustrated in the present application, the housings 14 comprise two open faces located opposite one another. These open faces are situated opposite the inlet and the outlet for charge air in the heat exchange core 12.

A configuration of this kind enables the body to define a frame around the open face(s).

The body of the housing 14 is formed by at least a first part and a second part, which are assembled together by brazing. In the embodiment illustrated in FIGS. 1 and 2, the body of the housing has four separate parts 30; 32; 34 and 36 that can be seen more clearly in FIG. 2. In this exploded view of the heat exchanger, a single plate 16 of the heat exchange core has been shown for the sake of simplicity.

Here, the four parts 30; 32; 34 and 36 are produced in the form of four approximately rectangular plates.

In other words, the housing 14 has a parallelepipedal form comprising four solid faces, namely: what is known as a bottom face 36, what is known as an upper face 32, two faces known as side faces 30 and 34 and two open faces located opposite one another. These open faces enable the charge air to flow in the heat exchange core 12.

The housing 14 comprises two tubes 18 and 20 for the inlet and outlet, in the exchanger 10, of a heat transfer fluid. The tubes 18 and 20 are provided at one of said parts 30; 32; 34; 36 of the housing 14. Here, the tubes 18 and 20 are located on the upper face 32.

Here, the bottom face 36 and the upper face 32 and the two side faces 30 and 34 are respectively located opposite one another.

At least one of the parts forming the housing 14 is in contact with one end of each of the plates 16 of the stack of plates of the heat exchange core 12.

Figure 2:
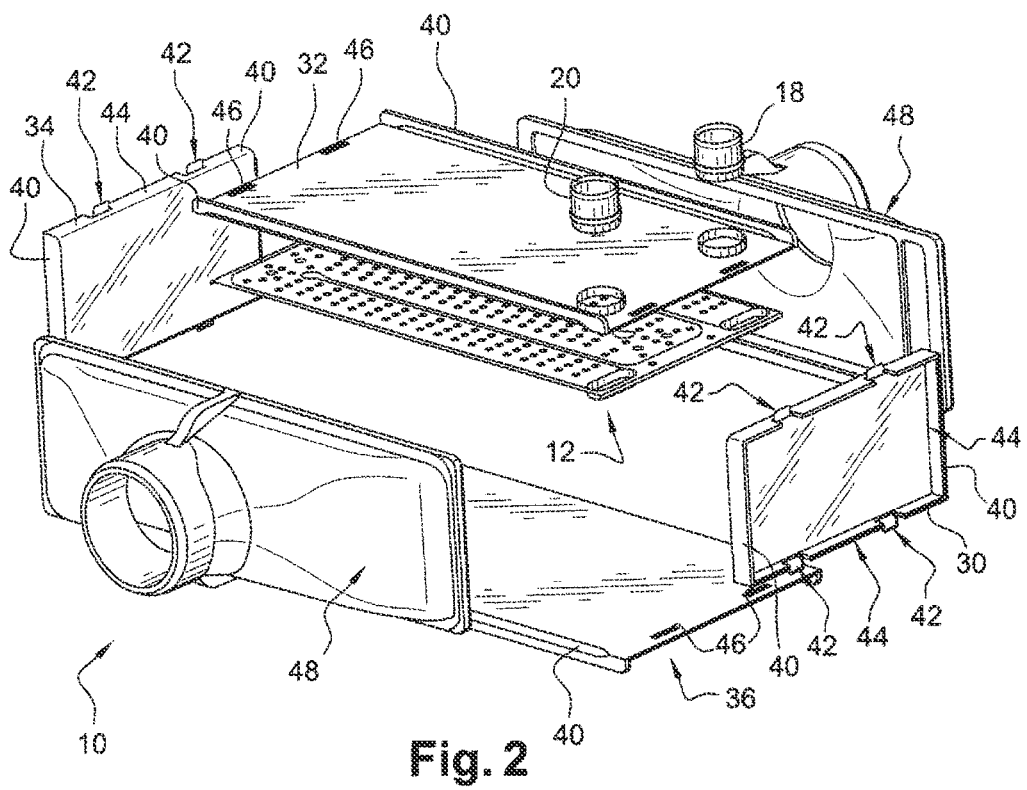
FIG. 2 shows a simplified, exploded view of the heat exchanger according to the present invention.

In the embodiment illustrated in FIGS. 1 and 2, it is a part called the second part which is in contact with one end of each of the plates 16, the second part being produced here in the form of at least one of the side faces 30 or 34.

In other words, the first part of the housing 14 is produced in the form of the upper face 32 and/or the bottom face 36. The second part of the housing 14 for its part comprises at least one of the two side faces 30 or 34 or even both side faces.

Here, the two side faces 30 and 34 are located opposite one another on either side of the open face of the housing 14. They are both in contact with all the plates 16 forming the stack of plates of the heat exchange core 12, each of the side faces being in contact with one end of said plates 16.

This feature makes it possible in particular for the heat exchanger to be even more resistant to the various mechanical stresses to which the heat exchanger is subject while it is being used in a motor vehicle, in particular its pressure resistance.

During the brazing of the various elements of the heat exchanger, the side faces 30 and 34 act as an end stop for the upper part 32. These side pieces 30 and 34 furthermore guarantee the generally parallelepipedal geometry of the housing 14 of the heat exchanger 10.

Specifically, the heat exchange core 12 is composed, as explained hereinabove, of plates 16 and inserts. During brazing, these various elements undergo a loss of height, since they contain on their surface a brazing coating which melts during the brazing operation. This loss of height phenomenon between the assembled product and the brazed product is also known as product "loosening".

In the embodiment shown, the side faces 30 and 34 are here in contact with the short sides of said plates 16. "Short sides" is the name given to the sides of the plates 16 which are located opposite one another, one of which, in this embodiment, comprises bosses.

One embodiment, which is not illustrated, proposes that the second part of the housing 14 comprises a U shape and that the first part of the housing 14 forms a cover for the second part. In other words, it is possible to provide a housing body in two parts, namely a U-shaped part (called the second part) comprising a bottom face and two side faces forming the legs of the U, and another part, which is for example planar, closing the volume of the second part.

It is furthermore provided that the first part of the housing 14 has a degree of freedom with respect to the second part of the housing 14 in the direction of the stack of plates 16 of the heat exchange core 12.

In the exemplary embodiments illustrated in FIGS. 1 and 2, this degree of freedom is obtained by at least one tab 42, which is located on the second part of the housing 14, engaging with a recess or indentation 46 located on the first part of the housing 14.

Specifically, the tabs 42 make it possible, during the brazing operation, for the bottom face 36 and the upper face 32 to slide with respect to the lateral pieces 30 and 34 and thus to accompany the loss of height of the heat exchange core 12, it being recalled that this decrease is due to the loosening phenomenon.

The tab 42 and the recess 46 are thus mutual assembling means arranged so as to manage/control the loosening of the heat exchanger 10.

Furthermore, these assembling means also have the advantage of being means for the self-centering of the first part of the housing 14 on the second part of the housing 14.

Specifically, the tabs 42 of the side faces 30 and 34 rest on the outside of the recesses 46 in the upper face 32 and in the bottom face 36. This has the advantage of not having to press laterally on the side faces 30 and 34 during brazing. Thus, only a vertical force is exerted on the upper face 32 and the bottom face 36 during brazing, thereby enabling the housing to self-center itself.

The tabs 42 extend here in approximately the same direction as that of the stack of plates of the heat exchange core 12.

As can be seen better in FIG. 2, each of the side faces 30 and 34 comprises two tabs 42 on each side of the lateral faces 30 and 34 in contact respectively with the upper face 32 and the bottom face 36.

In other words, in this example, each second part of the housing 14 or, here, side face 30 or 34 comprises, on two of its sides located opposite one another, two lugs 42 able to engage with a recess 46 located opposite these lugs 42 on the first part of the housing 14 or, here, upper face 32 and bottom face 36.

In the embodiment illustrated, each side face 30 and 34 furthermore comprises at least one raised edge 44, known as first raised edge 44 or else assembling edge of the housing. The first raised edge 44 extends here approximately at right angles with respect to the general plane of extension of the side face on which it is formed.

This first raised edge or assembling edge 44 of the housing is formed by folding up the material of each side face 30 or 34.

Here, the first raised edge 44 is formed on the parts of the side faces 30 and 34 which are respectively in contact with the upper face 32 and the bottom face 36.

In this embodiment, the tabs 42 are obtained by cutting and folding the first raised edge 44.

In other words, the second part of the housing 14 comprises at least one first raised edge 44 provided with a tab 42 and the tab 42 is able to engage with a recess 46 in the first part. The first raised edge 44 or assembling edge of the housing is thus involved in the assembling of the various elements of the housing 14.

Also in other words, each part 30; 32; 34 and 36 forming the housing 14 comprises at least one assembling means 42; 46 and/or 44 able to engage with the adjacent part so as to assemble the housing 14.

Thus, and by virtue of the engagement between the first raised edge 44, the tab 42 and the recess 46, the brazing of the side faces to the upper face 32 and the bottom face 36 leads to strengthened sealing of the housing 14 by reducing the risk of charge air escaping.

By virtue of the configuration of the heat exchanger 10, it is possible, in a single step, during the brazing operation, to assemble all the elements forming the heat exchange core 12 with those forming the housing 14.

The heat exchanger 10 has the feature according to which at least two adjacent parts of the body of the housing 14 comprise means for creating a support surface for a manifold 48. The term "manifold" is understood here to mean a cover and an intake air distributor for the engine.

In the embodiment illustrated in FIGS. 1 and 2, each manifold 48 is an inlet or outlet cover for the charge air. These manifolds 48 are provided respectively with a gas inlet tube and at least one gas outlet tube.

In the embodiment shown in FIGS. 1 and 2, each of the four parts 30; 32; 34 and 36 forming the housing 14 comprises means 40 for creating a support surface for a manifold for each open face of the housing. In other words, each of the open faces of the body of the housing 14 is bordered at least in part by means 40 for creating a support surface for a manifold 48.

In other words, here, the body of the housing is formed by at least two parts which are assembled together by brazing and at least two of said parts are provided adjacent to one another and comprise means 40 for creating a support surface for a manifold 48.

The means 40 for creating the support surface for the manifold 48 thus act as an interface between the body of the housing 14 and the manifold(s) 48.

Here, the means for creating a support surface are second raised edges 40 that could also be called manifold assembling edge.

Thus, by virtue of these means 40 for creating a support surface for a manifold, it is no longer necessary to connect additional connection pieces to the heat exchange core in order to form the charge air inlet/outlet housings.

The means 40 for creating a support surface consist, here, of raised edges 40 or manifold assembling edges 40.

The second raised edges 40 of a part 30; 32; 34 or 36 extend approximately perpendicularly with respect to the general plane of extension of said part.

In other words, in this embodiment, the parts 30; 32; 34; 36 of the body of the housing 14 each consist of a plate provided, on at least a part of its periphery, with means 40 for creating a support surface, these means consisting, here, of raised edges known as manifold assembling edges 40.

Here, each part 30; 32; 34 or 36 comprises at least one second raised edge in contact with the second raised edge of the adjacent part at one of its ends, so as to define the support surface over the entire periphery of the open face of the body of the housing. The support surface formed by the second raised edges 40 is, here, planar.

The aim of this planar surface is to create a "continuous" support surface which could serve for the welding of a manifold or of a flange having a likewise flat perimeter, so as to obtain a sealed weld.

In other words, in the embodiment in FIG. 1, the second raised edge of the part 36 (or bottom face) is in contact both with the second raised edge of the part 30 (or side face 30) and with the second raised edge of the part 34 (or side face 34).

Similarly, the second raised edge of the part 32 (or upper face) is in contact both with the second raised edge of the part 30 (or side face 30) and with the second raised edge of the part 34 (or side face 34).

In other words, the frame surrounding an open face of the body of the housing 14 comprises a set of second raised edges on its entire perimeter, each second raised edge 40 or manifold assembling edge 40 being in contact at each of its ends with another second raised edge 40.

Also in other words, the second raised edges form a border around the frame surrounding the open face of the body of the housing 14. This border acts as an interface between the housing 14 and the manifold 48.

In these examples, the second raised edges 40 are connected by a brazed joint.

The side faces 30 and 34 can thus be seen as approximately rectangular plates comprising a perimeter bordered by two sets of raised edges, these raised edges being composed of two first raised edges 44 and two second raised edges 40, each of the members of the different categories of raised edge being located opposite the member of the same category of raised edge. The function of the first raised edges 44 is to be involved in the assembling of the housing 14 and the second raised edges 40 serve to assemble a manifold 48 on the body of the housing 14.

In other words, at least one of the parts 30; 32; 34 or 36 of the housing 14 comprises a perimeter bordered by raised edges, these raised edges being composed, here, of two first raised edges 44 and two second raised edges 40, the first raised edges 44 being involved in the assembling of the housing 14 and the second raised edges 40 being involved in the assembling of a manifold 48 on the housing 14.

Also in other words, the side faces 30 and 34 are surrounded, here over their entire periphery, by a rib formed by the first raised edges 44 and by the second raised edges 40. This rib contributes to the mechanical strength of the heat exchanger 10.

The assembling of the manifold or manifolds 48 on the housing 14 is carried out, for example, by welding the manifold or manifolds to the border formed by the second raised edges 40 around the frame surrounding the open face of the body of the housing 14.

The manifolds could, for example, be aluminum housings, which are preferably obtained by the die casting method.

One embodiment of the invention furthermore proposes that at least one of the parts 30; 32; 34 or 36 comprises local deformations able to reduce the brazing clearances with respect to another part 30; 32; 34 or 36, this other part being adjacent to the parts 30; 32; 34 or 36 comprising local deformations.

Here, each part 30; 32; 34 and 36 comprises local deformations able to reduce the brazing clearances with respect to the various parts of the housing and thus to improve the continuity of the planar surface forming an interface with the manifold.

According to another embodiment, the upper face 32 and the bottom face 36 have a slightly greater width than the plates of the heat exchange core. In this way, the welding region of the manifold is spaced apart from the brazed regions.

The term "width" is understood here to mean the distance between two sides, either from the upper face 32 or the bottom face 36, or from a plate 16, in the direction of flow of the charge air in the heat exchanger, in other words, in the direction of the short sides of the plates 16.

Figure 3:
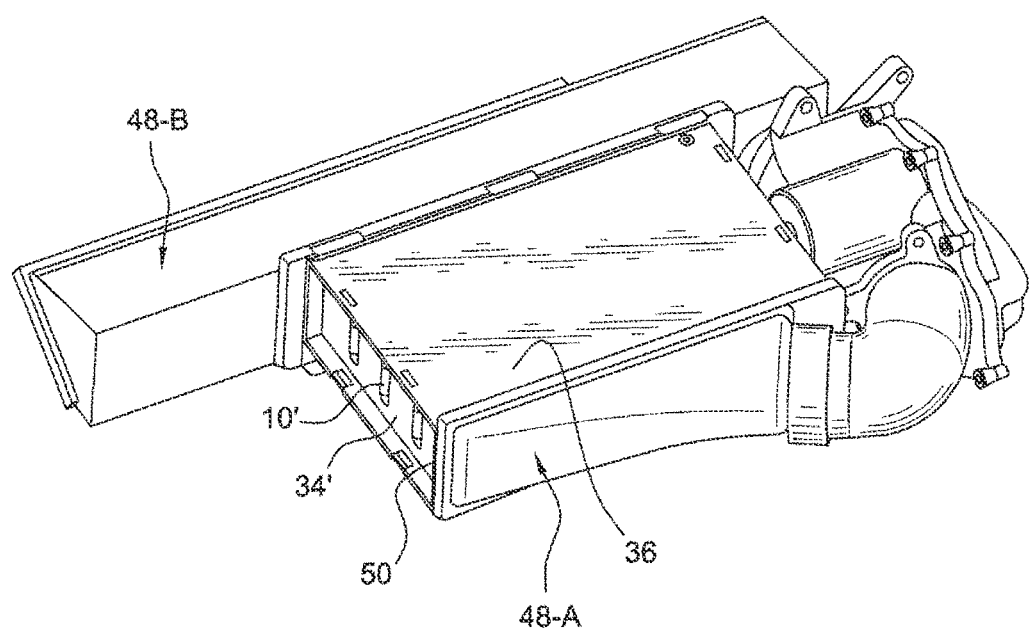
FIG. 3 shows an embodiment of the invention, in which the charge air outlet housing is an intake air distributor for the engine.

FIG. 3 proposes an embodiment of the invention, in which the charge air outlet manifold is produced in the form of an intake air distributor 48-B for the engine.

An intake air distributor for the engine enables communication, via orifices, with at least a part of the intake ducts of the intake chambers of the engine.

Also in other words, this distributor acts as an interface between the heat exchanger and the cylinder head of the engine, on which the heat exchanger 10' is mounted.

This distributor is also known as an intake manifold. It is secured to the cylinder head of the combustion chamber.

In this embodiment, the inlet of charge air into the heat exchanger takes place via an inlet housing 48-A, the housing here being produced in the form of a cover. The outlet of the charge air from the heat exchanger 10' takes place in turn via a distributor 48-B which, here, acts as an outlet housing for the charge air.

The side faces 34' of the housing of the heat exchanger comprise, in this embodiment, reinforcing ribs 50, of which there are in this case three.

The invention is not limited to the embodiments described hereinabove, which are described merely by way of example, but also encompasses all the variants that a person skilled in the art could envision within the scope of the following claims. The variants described hereinabove can be taken separately or in combination with one another.

The invention claimed is:

1. A heat exchanger (10) comprising a heat exchange core (12) and a housing (14), inside which said heat exchange core (12) is housed, said housing (14) comprises:

a body having at least one open face, said body defining a frame around said open face, and in that said body is formed by at least two parts (30; 32; 34; 36), which are assembled together by brazing, at least two of said parts being provided adjacent to one another comprising means (40) for creating a support surface for a manifold (48), said parts (30; 32; 34; 36) of said body each comprising a plate provided, on at least a part of its periphery, with said means (40) for creating a support surface, and wherein said means (40) for creating a support surface comprises raised manifold assembly edges (40), wherein said means for creating the support surface includes raised edges (40) extending approximately perpendicularly with respect to the general plane of extension of said plate forming one of said parts (30; 32; 34; 36), wherein at least one of said parts (30; 34) includes a perimeter bordered by first (44) and second (40) raised edges, and wherein an entire periphery of at least one of said parts (30; 34) is surrounded by a rib formed from said first (44) and second (40) raised edges.

2. The heat exchanger (10) as claimed in claim 1, wherein said housing (14) comprises four parts (30; 32; 34; 36).

3. The heat exchanger (10) as claimed in claim 1, wherein said means (40) is in contact with said means (40) of said adjacent part (30; 32; 34; 36) at one of its ends, so as to define said support surface over the entire periphery of the open face of said body of said housing (14).

4. The heat exchanger (10) as claimed in claim 2, wherein said raised edges (40) are connected by a brazed joint.

5. The heat exchanger (10) as claimed in claim 1, wherein said first raised edges (44) are involved in the assembling of said housing (14) and said second raised edges (40) are involved in the assembling of a manifold (48) on said housing (14).

6. The heat exchanger (10) as claimed in claim 1, wherein said body comprises two open faces located opposite one another.

7. The heat exchanger (10) as claimed in claim 1, wherein said housing (14) comprises two tubes (18; 20), provided at one of said parts (30; 32; 34; 36) of said housing (14), for the inlet and outlet, in said heat exchanger (10), of a heat transfer fluid.

8. The heat exchanger (10) as claimed in claim 7, wherein said heat exchange core (12) determines first channels for a gas to flow through and second channels for the heat transfer fluid to flow through.

9. The heat exchanger (10) as claimed in claim 1, wherein said heat exchange core (12) comprises a stack of plates (16).

10. The heat exchanger (10) as claimed in claim 1, wherein each of said parts (30; 32; 34; 36) of said housing (14) comprises an assembling means (42; 46) able to engage with said adjacent part so as to assemble said housing (14).

11. The heat exchanger (10) as claimed in claim 10, wherein said assembling means is a tab (42) and/or a recess (46).

12. The heat exchanger (10) as claimed in claim 2, wherein said raised edges (40) are in contact with said raised edges (40) of said adjacent part (30; 32; 34; 36) at one of its ends, so as to define said support surface over the entire periphery of the open face of said body of said housing (14).

13. The heat exchanger (10) as claimed in claim 12, wherein said raised edges (40) are connected by a brazed joint.

14. The heat exchanger (10) as claimed in claim 3, wherein said means (40) are connected by a brazed joint.

* * * * *

UNITED STATES PATENT AND TRADEMARK OFFICE
CERTIFICATE OF CORRECTION

| | | |
|---|---|---|
| PATENT NO. | : 8,739,857 B2 | Page 1 of 1 |
| APPLICATION NO. | : 13/001162 | |
| DATED | : June 3, 2014 | |
| INVENTOR(S) | : Garret et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 444 days.

Signed and Sealed this
Eighth Day of September, 2015

Michelle K. Lee
*Director of the United States Patent and Trademark Office*